US008527863B2

(12) United States Patent
Duquene et al.

(10) Patent No.: US 8,527,863 B2
(45) Date of Patent: Sep. 3, 2013

(54) NAVIGATING THROUGH CROSS-REFERENCED DOCUMENTS

(75) Inventors: Joel Duquene, Raleigh, NC (US); Morris S. Johnson, Jr., Cary, NC (US); Henri F. Meli, Cary, NC (US); Jacques-Marie Thrasybule, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 13/155,551

(22) Filed: Jun. 8, 2011

(65) Prior Publication Data

US 2012/0317468 A1    Dec. 13, 2012

(51) Int. Cl.
*G06F 17/21* (2006.01)
(52) U.S. Cl.
USPC .......................................................... 715/207
(58) Field of Classification Search
USPC .......................................................... 715/207
See application file for complete search history.

(56) References Cited

U.S. PATENT DOCUMENTS

| 5,822,539 | A | * | 10/1998 | van Hoff | 709/236 |
|---|---|---|---|---|---|
| 6,006,252 | A | * | 12/1999 | Wolfe | 709/203 |
| 6,263,351 | B1 | * | 7/2001 | Wolfe | 715/236 |
| 6,289,342 | B1 | * | 9/2001 | Lawrence et al. | 1/1 |
| 6,292,813 | B1 | * | 9/2001 | Wolfe | 715/205 |
| 6,647,534 | B1 | * | 11/2003 | Graham | 715/205 |
| 7,043,526 | B1 | * | 5/2006 | Wolfe | 709/203 |
| 7,107,517 | B1 | * | 9/2006 | Suzuki et al. | 715/207 |
| 7,143,348 | B1 | * | 11/2006 | Krause | 715/236 |
| 7,177,948 | B1 | * | 2/2007 | Kraft et al. | 709/246 |
| 7,302,638 | B1 | | 11/2007 | Wolfe | |
| 7,493,560 | B1 | * | 2/2009 | Kipnes et al. | 715/729 |
| 7,596,766 | B1 | | 9/2009 | Sharma et al. | |
| 7,668,887 | B2 | * | 2/2010 | Vella | 707/706 |
| 8,032,533 | B1 | * | 10/2011 | Spencer et al. | 707/746 |
| 2002/0089533 | A1 | * | 7/2002 | Hollaar et al. | 345/738 |
| 2004/0088332 | A1 | * | 5/2004 | Lee et al. | 707/200 |
| 2005/0235203 | A1 | * | 10/2005 | Undasan | 715/526 |
| 2005/0278633 | A1 | * | 12/2005 | Kemp | 715/713 |
| 2005/0289446 | A1 | * | 12/2005 | Moncsko et al. | 715/501.1 |
| 2006/0112084 | A1 | * | 5/2006 | McBeath et al. | 707/3 |

(Continued)

FOREIGN PATENT DOCUMENTS

EP    1653384 A2 * 5/2006
WO    WO 2010141480 A2 * 12/2010

OTHER PUBLICATIONS

Zhang et al., Semantics-Based Legal Citation Network, ACM, ICAIL '07, Palo Alto, CA, Jun. 4-8, 2007, p. 123-130.*

*Primary Examiner* — Frank D Mills
(74) *Attorney, Agent, or Firm* — DeLizio Gilliam, PLLC

(57) ABSTRACT

An instruction is received to display a section of a referencing document on a screen. The section has at least one referencing link referencing a different section. The section of the referencing document is displayed on the screen. A selection of a referencing link is received. The different section referenced by the referencing link is displayed on the screen, at least partially at a same time of the displaying of the section of the referencing document. A visual indicator that associates the referencing link with the different section is displayed. Also in response to receiving the selection and in response to determining that the section of the referencing document includes multiple reference links of the at least one reference link to different section, other visual indicators that associate the multiple referencing links with the different section are displayed.

14 Claims, 6 Drawing Sheets

(56) References Cited

U.S. PATENT DOCUMENTS

| | | | |
|---|---|---|---|
| 2006/0287971 A1* | 12/2006 | Armstrong | 707/1 |
| 2007/0239706 A1* | 10/2007 | Zhang et al. | 707/5 |
| 2007/0255686 A1* | 11/2007 | Kemp et al. | 707/3 |
| 2008/0016091 A1* | 1/2008 | Chandra | 707/100 |
| 2008/0046845 A1* | 2/2008 | Chandra | 715/856 |
| 2008/0082929 A1* | 4/2008 | Stignani et al. | 715/764 |
| 2008/0120549 A1* | 5/2008 | Meyers et al. | 715/719 |
| 2009/0313316 A1 | 12/2009 | Kemp | |
| 2010/0030749 A1* | 2/2010 | Dahn | 707/3 |
| 2010/0306636 A1 | 12/2010 | Ran et al. | |
| 2011/0289105 A1* | 11/2011 | Hershowitz | 707/769 |

* cited by examiner

NAVIGATING THROUGH CROSS-REFERENCED DOCUMENTS

BACKGROUND

Embodiments of the inventive subject matter generally relate to the field of computers, and, more particularly, to navigating through cross-referenced documents.

There are many types of electronic documents, including word processor documents, spreadsheets, Portable Document Format (PDF) document, etc. It can be very common for a document to contain references to other sections in the same document or other documents.

SUMMARY

In some example embodiments, a method includes receiving an instruction to display a section of a referencing document on a screen. The section has at least one referencing link referencing a different section, wherein the different section comprises at least one of a different section of the referencing document and a different section of a referenced document. The method includes displaying the section of the referencing document on the screen. The method also includes receiving a selection of a referencing link. In response to receiving the selection, the method includes displaying, at least partially at a same time of the displaying of the section of the referencing document, the different section referenced by the referencing link on the screen. In response to receiving the selection, the method includes displaying, at least partially at a same time of the displaying of the section of the referencing document, the different section referenced by the referencing link on the screen. In response to receiving the selection, the method includes displaying a visual indicator that associates the referencing link with the different section. Also in response to receiving the selection and in response to determining that the section of the referencing document includes multiple reference links of the at least one reference link to different section, the method includes displaying other visual indicators that associate the multiple referencing links with the different section.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
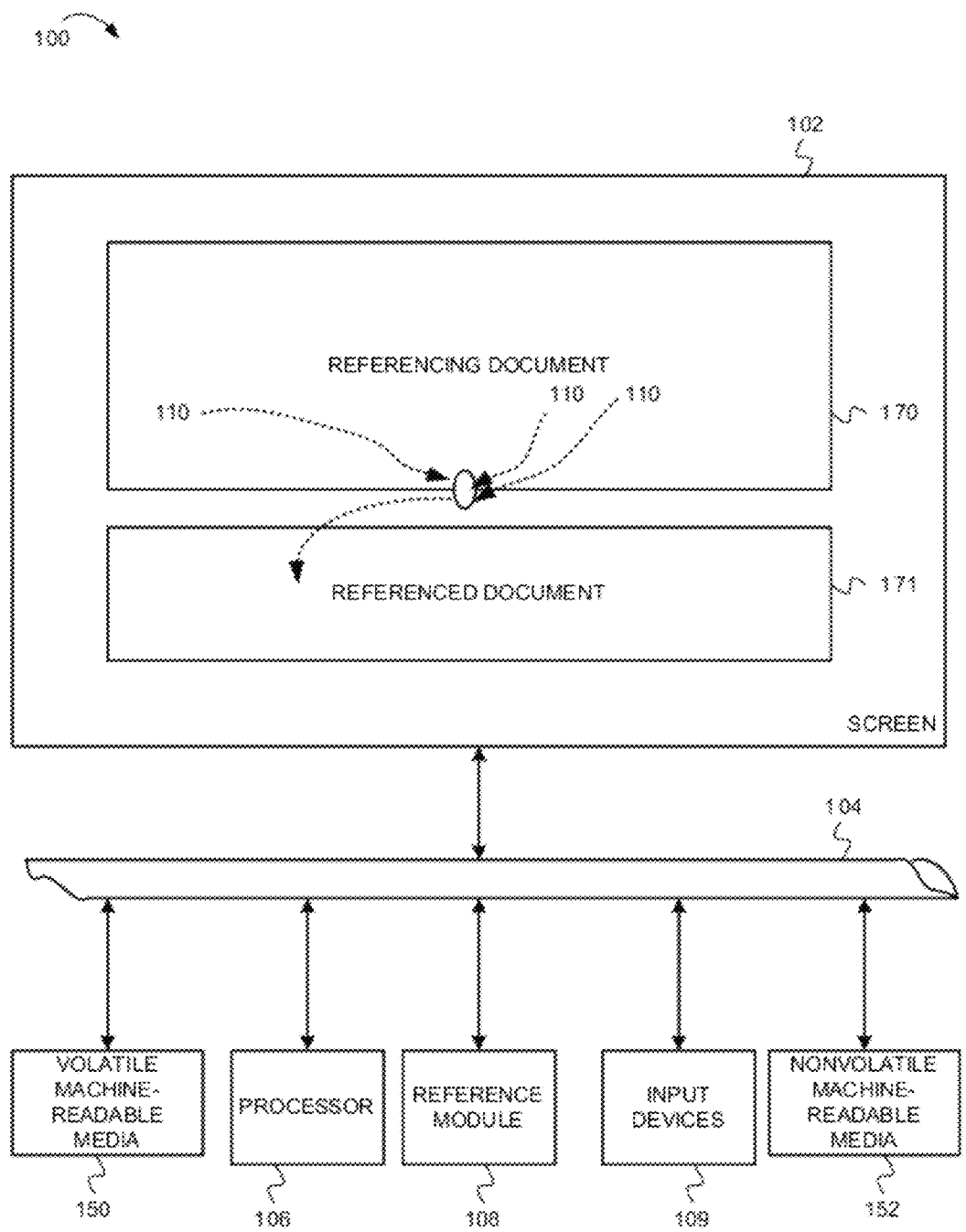
FIG. 1 depicts a system for providing navigation through cross-referenced documents, according to some example embodiments.

The description that follows includes exemplary systems, methods, techniques, instruction sequences and computer program products that embody techniques of the present inventive subject matter. However, it is understood that the described embodiments may be practiced without these specific details. For instance, although examples refer to referencing between two documents, more than two documents can be displayed and linked. In other instances, well-known instruction instances, protocols, structures and techniques have not been shown in detail in order not to obfuscate the description.

Embodiments are described using the terms referencing document and referenced document. A referencing document can include a document having a link that points to or references a different section within the referencing document or a different section within a different document (termed the referenced document). When the same section of a referencing document has multiple links to other sections within the same document or other documents (referenced documents), navigating to the referenced section and then back to the original section where the navigation originated can become tedious. The user can lose track of the flow of the document because of this constant back and forth that can take place between the original section and the referenced sections.

Some example embodiments display both the referenced document and/or section and a source location in the referencing document where the referencing link is located. A visual indicator can connect the source location in the referencing document and the referenced document. The referenced document can be displayed at different locations on a screen relative to the source location. For example, the referenced document can be display on the right parallel with the referencing document, at the bottom vertical with the referencing document, etc. In some example embodiments, references (e.g., numbers, letters, etc.) are added next to the links between the referencing document and the referenced document to allow for easier referencing.

Some example embodiments provide forward linking when a referencing document has references to locations in the referenced documents. Some example embodiments allow for jumping to a next link in the referencing document for forward browsing for referencing of the same referenced document. Such a configuration allows a user to navigate to the next referencing link in the referencing document or to select from a list of links and jump to a particular location in the referencing document while also indicating the location of the link in the referenced document.

Also, some example embodiments provide reverse linking, wherein the different sections in the referenced document that are being referenced from the referencing document are located and identified. Reverse links can allow a user to navigate back to the referencing document in a manner similar to forward links.

Some example embodiments maintain a history of navigation and provide the user the ability to retrace their navigation steps after they close and reopen the referencing and/or referenced documents. Also, some example embodiments keep the referenced document active (e.g., cached) unless a new reference is selected to point to a different referenced document. Such embodiments avoid the closing and opening of the same document when navigating links that are either referenced from or referenced in the same document. Some example embodiments provide a view of history of the link navigation and restore the navigation link history when the documents are opened. Also, a referenced page can remain active unless a next reference selected points to a different page in the referenced document. Also, when the referenced document is closed, the focus of display can return to the document from which this target or referenced document was invoked (i.e., the source location in the referencing document).

With conventional referencing, when selecting a reference link, the referenced document is open in another window (if the reference is external to the source document) or jump to the different location that is referenced (if the reference is internal to the source document). With conventional referencing it may not be clear where the links point to in a target document. Also, it may not also be clear where a particular section of a document is being referenced in other documents. Furthermore with conventional referencing, if a link references a different section in the same document, selecting the link can cause navigation to this different section (the referenced section). In such a situation, the user can lose track of where they navigated from.

In some example embodiments, a user is able to navigate to a next or previous referencing link in the referencing document. Such navigation can be performed by some key combination, displaying a visual dialog with the referencing links so that the user can navigate directly to the location where a desired referencing link points, etc. Once selected, the referenced document can be displayed alongside the section of the referencing document having the associated referencing link.

In some examples, multiple referencing documents can reference a same referenced document. When the referenced document is being displayed, the multiple referencing documents that include referencing links to this referenced document can also be shown on the same screen. For example, if the number of referencing documents is too large to be individually displayed, the referencing documents can be displayed in a card stack format. A visual indicator can be added that points from the location in the referenced document that links in the referencing documents. Also, the visual indicator can then point from the referencing link to the referenced location in the referenced document.

In some example embodiments, a user is able to navigate to a next or previous referenced link in the referenced document. Such navigation can be performed by some key combination, displaying a visual dialog with the referenced links so that the user can navigate directly to the location where the referenced link originates, etc. Once selected, the referencing document can be displayed alongside the section of the referenced document having the associated referenced link. A visual indicator can then point from the referencing location in the referencing document to the referenced location in the referenced document.

In some example embodiments, when a referencing document and a referenced document are displayed alongside each other and as the user is hovering over a different link (either referenced or referencing), a visual can point from the link to the referenced location in the referenced document. Likewise, as the user is hovering over a referenced location in the referenced document, a visual can point from the link to the referenced location in the referenced document. If the location of either the referenced link or the referencing link is not in view, such locations are brought into view so that the links can indicate where they are located in the documents.

Therefore, if a user is in a referenced section in a referenced document, the user can request the referencing document be brought into view along with the view of the referenced section. A visual indicator can show the relationship between a referencing location in the referencing document and the referenced section in the referenced document. Also, if a user is in a referencing section of a referencing document, the user can request the referenced document to be brought into view along with the view of the referencing section. A visual indicator can show the relationship between the referenced section and the referencing location.

In some example embodiments, metadata, documentation, comments, etc. can be added in the referenced section of the referenced document or the referencing section of the referencing document. The comments can include comments from a person reviewing the referencing document or referenced document. In some example embodiments, the metadata can include a summary, the author, date of publication, etc. of the referenced document. The metadata, documentation, comments, etc. can be displayed when the link between the referenced section and the referencing section is shown, hovered over, etc. If the location in the referencing section associated with the link is selected, the metadata, documentation, comments, etc. can be displayed.

Some example embodiments allow for more than two documents to be displayed in a same view. For example, assume that Document A has a reference to Document B that has a reference to Document C. Assume that Document A is being viewed and that a user causes Document B to be viewed alongside Document A with the visual indicators between the references (as described above). In some example embodiments, the user is able to navigate to locations in Document B that reference Document C. In this case, Document C can also be brought into view alongside Document A and Document B. The link between Document A and Document B can still be displayed, while the link between Document B and Document C is displayed. In such a configuration, a user is able to follow the relationship to better understand the flow between the three documents as well as the links between points in one document and the locations in another document that are referenced.

FIG. 1 depicts a system for providing navigation through cross-referenced documents, according to some example embodiments. FIG. 1 depicts system 100 that includes screen 102, processor 106, reference module 108, input devices 109, volatile machine-readable media 150, and nonvolatile machine-readable media 152 that are communicatively coupled together through bus 104. FIG. 1 can represent any type of computing device (e.g., a desktop computer, laptop computer, mobile device, etc.). Also the components of FIG. 1 can be in a single device or distributed across two or more devices.

Processor 106 can be one processor or possibly multiple processors, multiple cores, multiple nodes, and/or implementing multi-threading, etc. Volatile machine-readable media 150 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Although illustrated as being coupled to bus 104, volatile machine-readable media 150 may be directly coupled to processor 106. Nonvolatile machine-readable media 152 can include optical storage, magnetic storage, etc. Input device(s) 114 can include a touchscreen of the screen 102, a keyboard, mouse, microphone, etc. System 100 can include other components not shown in FIG. 1. For example, system 100 can include a network interface (e.g., an ATM interface, an Ethernet interface, a Frame Relay interface, SONET interface, wireless interface, etc.).

Reference module 108 can be software, firmware, hardware or a combination thereof. For example, reference module 108 can be software that is loaded into processor 106 for execution therein. As further described below, reference module 108 can provide cross-referencing among documents. For example, reference module 108 can display both a referenced document and/or section and a source location in the referencing document where the referencing link is located. Reference module 108 can also provide a visual indicator to connect the source location in the referencing document and the referenced document. The referenced document can be displayed at different locations on a screen relative to the source location. For example, the referenced document can be display on the right parallel with the referencing document, at the bottom vertical with the referencing document, etc. In some example embodiments, reference module 108 adds references (e.g., numbers, letters, etc.) next to the links between the referencing document and the referenced document to allow for easier referencing.

Reference module 108 can also add metadata, documentation, comments, etc. in the referenced section of the referenced document or the referencing section of the referencing document. The comments can include comments from a person reviewing the referencing document or referenced document. In some example embodiments, the metadata can include a summary, the author, date of publication, etc. of the referenced document. The metadata, documentation, comments, etc. can be displayed when the link between the referenced section and the referencing section is shown, hovered over, etc. If the location in the referencing section associated with the link is selected, the metadata, documentation, comments, etc. can be displayed.

To illustrate, screen 102 includes a display of referencing document 170 and referenced document 171. For example, the display can include a portion (e.g., a page) of a document. Referencing document 170 includes multiple referencing links 110 to a same document (referenced document 171). As further described below, system 100 provides for navigation across multiple documents, without losing track of the flow while going back and forth between documents and their references. Multiple documents are viewed on a same screen. Also, visual indicators (e.g., arrows, references numbers, etc.) are provided to show the relationship among the links among these multiple documents. Some example embodiments identify other sections in the same referencing document that also match the reference, but that are not currently in view.

Figure 2:
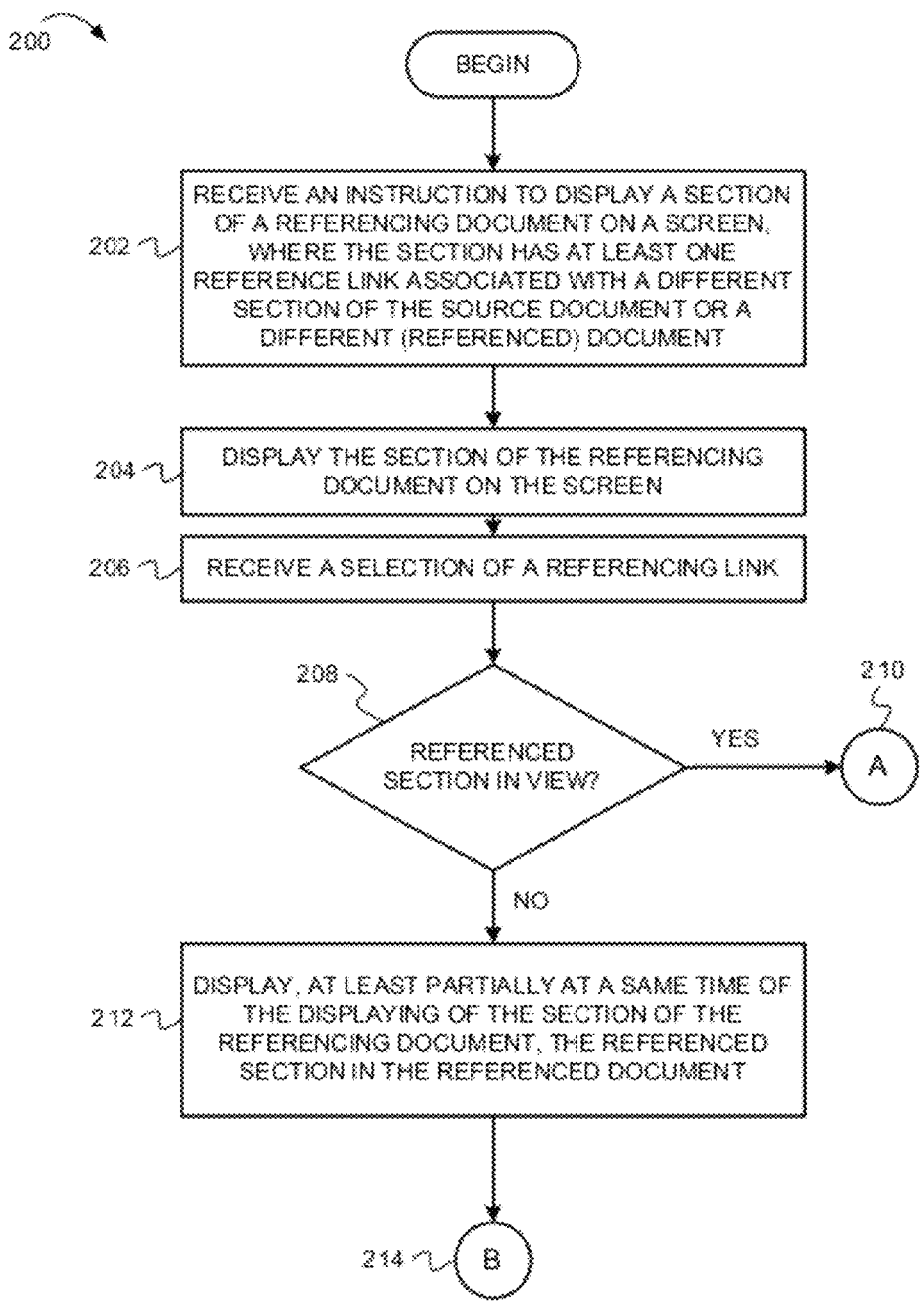
FIGS. 2-3 depict flowcharts for providing navigation through cross-referenced documents, according to some example embodiments.
Figure 3:
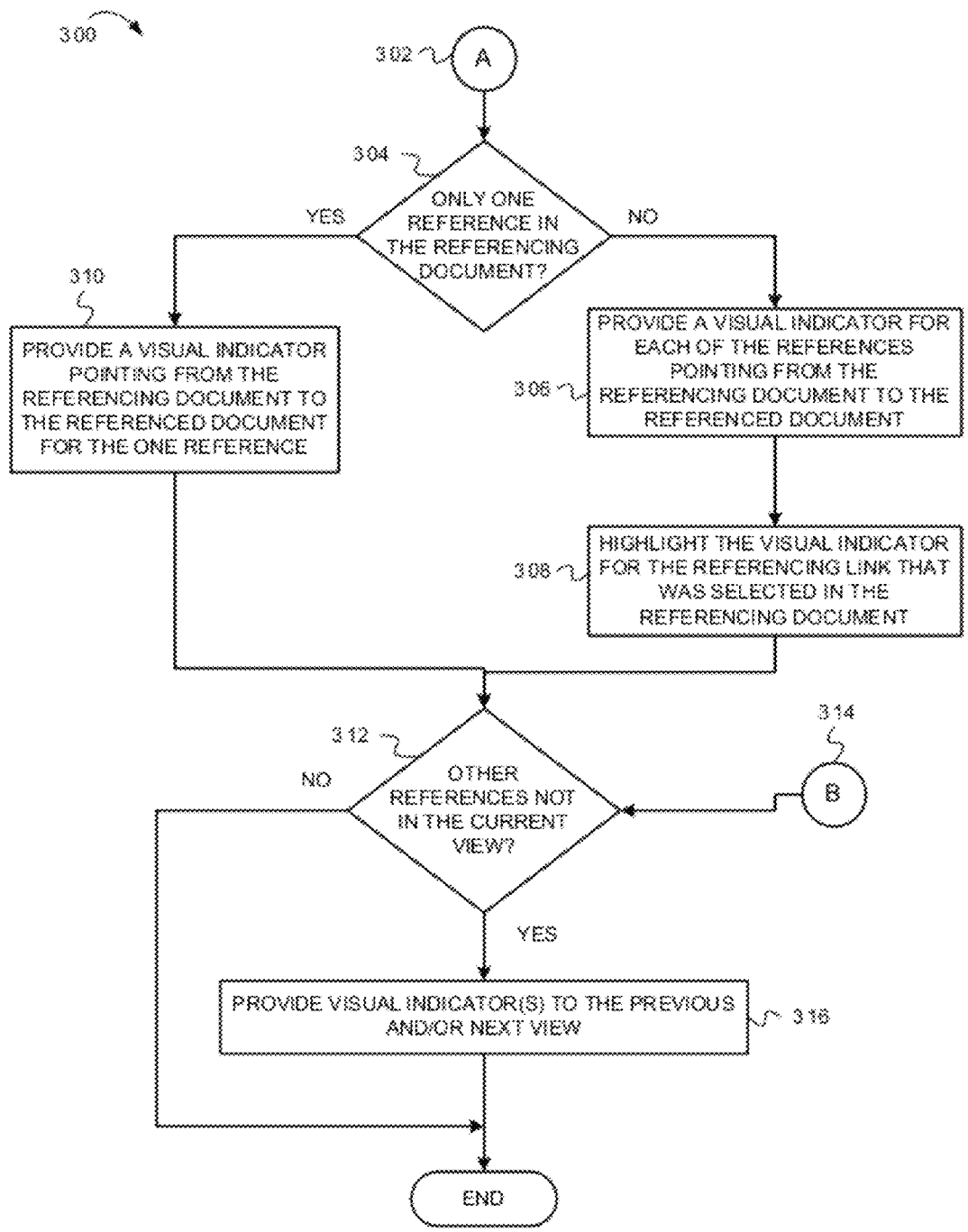
Figure 4:
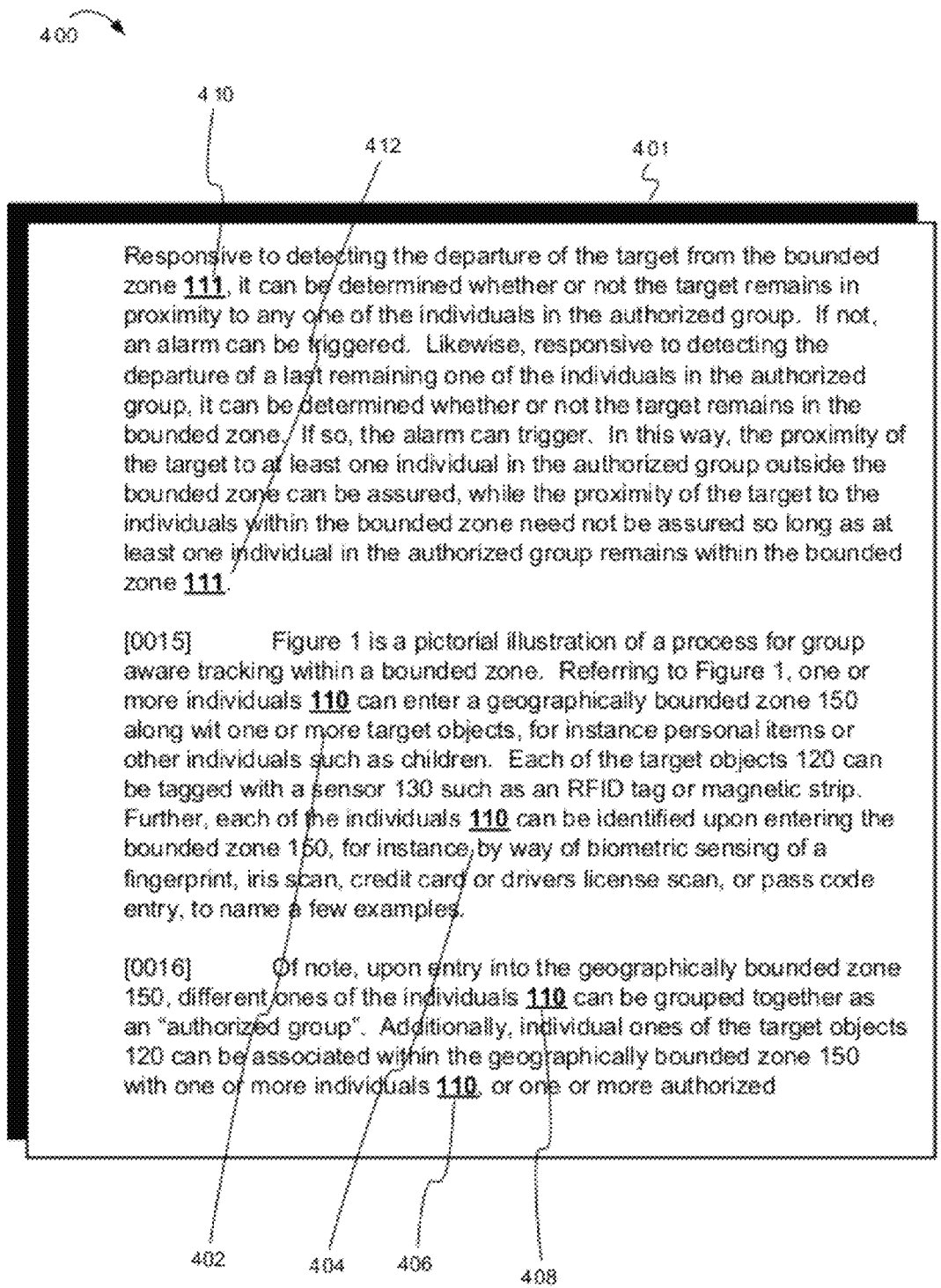
FIG. 4 depicts a screenshot of a section of a referencing document, according to some example embodiments.
Figure 5:
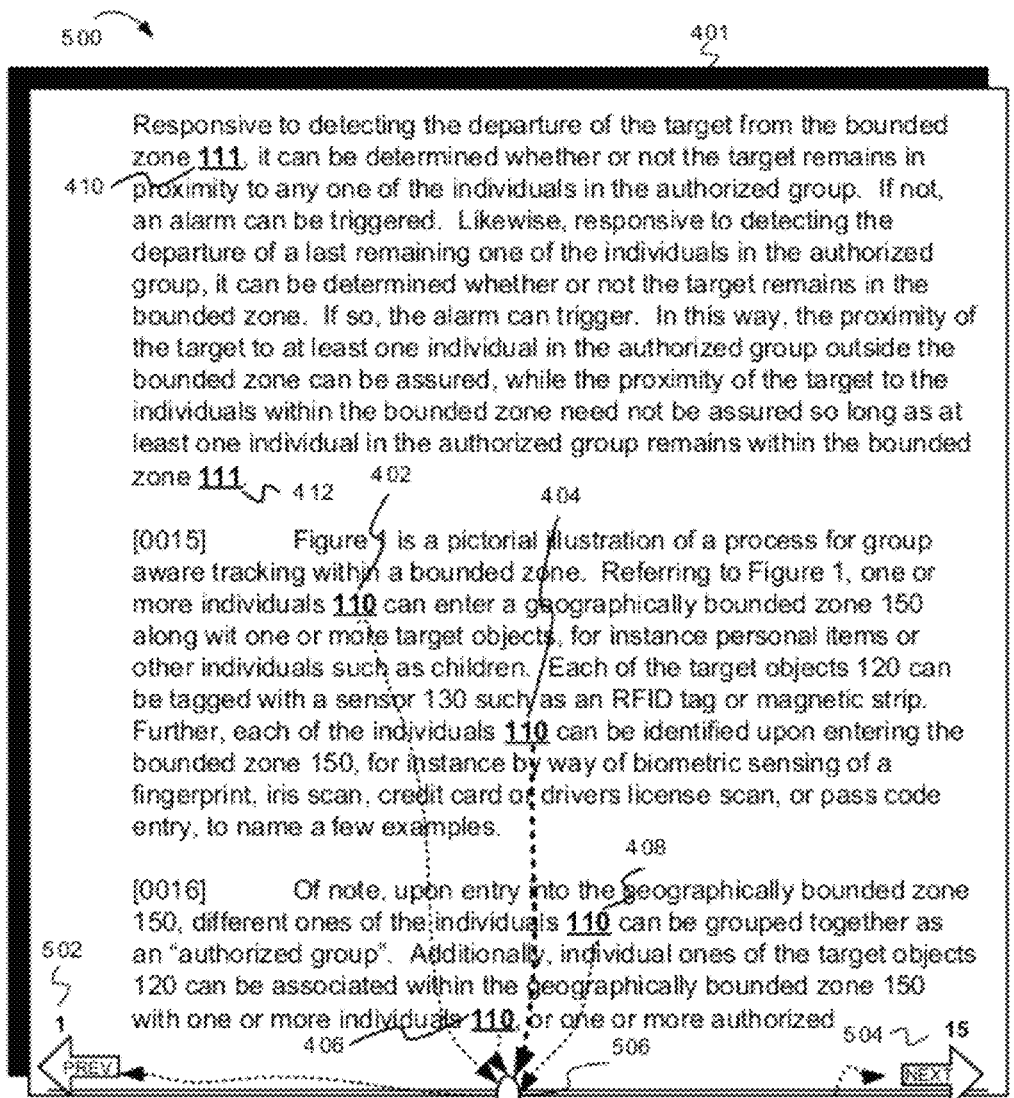
FIG. 5 depicts a screenshot of a section of a referencing document alongside a section of a referenced document displayed below, according to some example embodiments.

To better illustrate, flowcharts of the operations of reference module 108 are now described. Also, screenshots illustrating cross-referencing of documents at two different points in time are also described in conjunction with the description of the flowcharts. FIGS. 2-3 depict the two flowcharts, and FIGS. 4-5 depicts the two screenshots. In particular, FIGS. 2-3 depict flowcharts for providing navigation through cross-referenced documents, according to some example embodiments. The operations of flowchart 200 of FIG. 2 continue into the operations of flowchart 300 of FIG. 3 at transition points A and B (as further described below). The operations of a flowchart 200 are described with reference to FIG. 1. The operations of flowchart 200 start at 202.

Reference module 108 receives an instruction to display a section of a referencing document on a screen, where the section has at least one reference link associated with a different section of the referenced document or a different section of a different document (a referenced document) (202). For example, a user can be editing a word processing document wherein a page of the document is displayed on a screen of a device. This can be in response to a user opening the referencing document, changing to a different page of the referencing document that is already opened, etc. To illustrate, FIG. 4 depicts a screenshot of a section of a referencing document, according to some example embodiments. A section of referencing document 400 is shown in FIG. 4. This viewable section of referencing document 400 includes four different referencing links to a reference denoted by 110—referencing link 402, referencing link 404, referencing link 406, and referencing link 408. This viewable section of referencing document 400 also includes two different referencing links to a different reference denoted by 111—referencing link 410 and referencing link 412. Referencing link 402, referencing link 404, referencing link 406, and referencing link 408 reference a same section (denoted by 110). This same section can be a different section of referencing document 400 or a section of a different document (not shown in FIG. 4). Referencing link 410 and referencing link 412 reference a same section (denoted by 111). This same section can be a different section of referencing document 400 or a section of a different document (not shown in FIG. 4). Accordingly, in this example, two different sections of the same or different document are referenced (110 and 111). Returning to FIG. 2, the operations of flowchart 200 continue at 204.

Reference module 108 displays the section of the referencing document on the screen of a device (204). With reference to FIG. 1, reference module 108 can cause the section of referencing document 170 to be displayed on screen 102 of system 100. The operations of flowchart 200 continue at 206.

Reference module 108 receives a selection of a referencing link (206). With reference to FIG. 1, reference module 108 can receive the selection from a user through one of input devices 109. For example, the user can select a referencing link using a keyboard input, mouse click, etc. With reference to FIG. 4, assume that the user selected referencing link 404 for the reference 110. The operations of flowchart 200 continue at 208.

Reference module 108 determines whether the referenced section is currently being viewed on the screen (208). In particular, the referenced section may be currently shown on the screen based on the user previously selecting one of the referencing links that reference the referenced section being viewed on the screen. For example with reference to FIG. 4, multiple referencing links (referencing link 402, the referencing link 404, referencing link 406, and referencing link 408 reference a same section (denoted by 110)) can be pointing to same referenced section. If the referenced section is currently being viewed on the screen, the operations of flowchart 200 continue at transition point A 210, which is continued at transition point A 302 of flowchart 300 (which is further described below). If the referenced section is not currently being viewed on the screen, the operations of flowchart 200 continue at 212.

Reference module 108 displays, at least partially at same time of the displaying of the section of the referencing document, the first referenced section in the referenced document (212). With reference to FIG. 1, referencing module 108 brings referenced document 171 onto screen 102 alongside referencing document 170 (assuming that referenced document 171 was not being previously displayed on screen 102). The referenced document can be displayed at any location alongside the referencing document. For example, the referenced document can be displayed below, displayed above, displayed to the left of, displayed to the right of, etc. of referencing document. To illustrate, FIG. 5 depicts a screenshot of a section of a referencing document alongside a section of a referenced document displayed below, according to some example embodiments. In particular, FIG. 5 depicts screenshot 500 of the referencing document 401 depicted in screenshot 400 of FIG. 4 after a user selects referencing link 404. As shown, referencing document 401 includes four different referencing links to a reference denoted by 110—referencing link 402, referencing link 404, referencing link 406, and referencing link 408. This viewable section of referencing document 401 also includes two different referencing links to a different reference denoted by 111—referencing link 410 and referencing link 412. Referencing link 402, referencing link 404, referencing link 406, and referencing link 408 reference a same section (denoted by 110). Referencing link 410 and referencing link 412 reference a same section (denoted by 111). In response to the selection of referencing link 404 by a user, the referenced section of the referenced document is displayed alongside referencing document 401. In this example, referenced document 501 is displayed below referencing document 401. The remaining description of screenshot 500 of FIG. 5 is described below in conjunction with the relevant operations in flowcharts 200 and 300. Returning to the operations of flowchart 200 of FIG. 2, the operations continue at transition point B 214, which is continued at transition point B 314 of flowchart 300 (which is further described below).

The operations of flowchart 300 are now described with reference to FIGS. 1 and 4-5. The operations of flowchart 300 start at transition point 302, which is a continuation of operations from transition point 210 in flowchart 200. In particular, operations start transition point 302 in response to the determination that the referenced section is already in view at 208 of flowchart 200. From transition point 302, operations continue at 304.

Reference module 108 determines whether only one reference is in the referencing document references the referenced section in the referenced document (304). In particular, there can be one or multiple referencing links in the referencing document that reference the referenced section. With reference to FIG. 5 to illustrate, referencing document 401 includes four referencing links that are in the viewable section of referencing document 401—referencing link 402, referencing link 404, referencing link 406, and referencing link 408. In some other examples, there can be a single referencing link in referencing document 401 that reference the referenced section of the referenced document 501. Accordingly, reference module 108 determines where there is one or multiple referencing links in the referencing document to the referenced section that is being viewed (in response to selection of the referencing link at 206). If there are multiple references in the referencing document, operations of flowchart 300 continue at 306. If there is only one reference in the referencing document, operations of flowchart 300 continue at 310.

Reference module 108 provides a visual indicator for each of the references pointing from the referencing document to the referenced section of the referenced document (306). With reference to FIG. 5 to illustrate, there are four visual indicators pointing from a referencing link in referencing document 401 to central point 506. Central point 506 is a gathering location for the visual indicators from referencing document 401 and to referenced document 501 (for easier viewing of the multiple visual indicators on screenshot 500). In this example, the visual indicators include dashed arrow. However, any type of visual indicator can be used to provide a visual of the relationship between the referencing links and the referenced section. A first visual indicator is from referencing link 402 to central point 506. A second visual indicator is from referencing link 404 to central point 506. A third visual indicator is from referencing link 406 to central point 506. A fourth visual indicator is from referencing link 408 to central point 506. A fifth visual indicator is from central point 506 to the referenced section of referenced document 501. Returning to FIG. 3, operations of flowchart 300 continue at 308.

Reference module 108 highlights the visual indicator for the referencing link that was selected in the referencing document (308). In particular, the visual indicator for the referencing link selected at block 206 of flowchart 200 is highlighted. With reference to FIG. 5 to illustrate, reference module 108 highlights the visual indicator from referencing link 404 to central point 506. In this example, the highlighting includes a bolding of the dashed arrow. However, any type of highlighting can be used (e.g., flashing or blinking of the visual indicator, solid visual indicator, colored referencing link, flashing or blinking of referencing link, etc.). Such highlighting enables the user to determine from which referencing link the navigation to the referenced section was initiated. The visual indicators to the other referencing links also enables the user to easily determine the other locations in the referencing document that reference this referenced section of referenced document 501. Returning to FIG. 3, operations of flowchart 300 continue at 312 (which is further described below).

Reference module 108 provides a visual indicator for the one reference pointing from the referencing document to the referenced section of the referenced document (310). With reference to FIG. 5 to illustrate, assume that referencing link 404 is the only reference to the referenced section of referenced document 501. Reference module 108 provides the visual indicator from referencing link to referenced section of referenced document 501. This may or may not include a central point (like central point 506). For example, the visual indicator may point directly to the referenced section of referenced document 501. Alternatively, the visual indicator can point to a central point. A separate visual indicator can then point from the central point to the referenced section. This can be particularly useful if there are referencing links in previous or subsequent sections of the referencing document that are not currently viewable (as further described below). Returning to FIG. 3, operations of flowchart 300 continue at 312.

Reference module 108 determines whether there are other references not in the current view (312). In particular, there can be other referencing links in the referencing document (either in a previous or subsequent section relative to the current section that being viewed). If there are not other references that are not in the current view, operations of flowchart 300 are complete. Otherwise, operations continue at 316.

Reference module 108 provides visual indicator(s) to the previous and/or next views. With reference to FIG. 5 to illustrate, there are also other referencing links (that are not in the current viewable section of referencing document 401) to the referenced section of the referenced document 501. In particular, referencing document 401 includes one referencing link in previous sections relative to the current view—denoted by visual indicator 502 (that points to the left and indicates that there is "1" referencing link in a previous section). The referencing link can be at any point previous to the current viewing section of referencing document 401 (e.g., previous page, 50 pages previously, first page, etc. of referencing document 401). Also, referencing document 401 includes 15 referencing links in the next sections relative to the current view—denoted by visual indicator 504 (that points to the right and indicates that there is "15" referencing links in subsequent sections). The referencing links can be at any point subsequent to the current viewing section of referencing document 401 (e.g., next page, 100 pages subsequent, last page, etc. of referencing document 401). Also, a visual indicator is added for each of visual indicators 502 and 504. A first visual indicator points from central point 506 to previous visual indicator 502. A second visual indicator points from central point 506 to next visual indicator 504. These next and previous visual indicators enable a user to easily identify that other sections of the referenced document (previous or next sections) that reference the reference section as well as the number of references in these sections. These visual indicator for next and previous (visual indicator 502 and visual indicator 504) can also be overloaded to provided additional functionality. For example, visual indicator 502 can be used to show previous other referenced documents external to the referencing document. Visual indicator 504 can be used to show external documents that have not yet been viewed by the user. Therefore, the user can select visual indicator 502 to view other referenced documents previously viewed. Similarly, the user can select visual indicator 504 to view other referenced documents not yet viewed by the user.

In some example embodiments, metadata, documentation, comments, etc. can be added in the referenced section of the referenced document or the referencing section of the referencing document. The comments can include comments from a person reviewing the referencing document or referenced document. In some example embodiments, the metadata can include a summary, the author, date of publication, etc. of the referenced document. The metadata, documentation, comments, etc. can be displayed when the link between the referenced section and the referencing section is shown, hovered over, etc. If the location in the referencing section associated with the link is selected, the metadata, documentation, comments, etc. can be displayed.

Figure 6:
FIG. 6 depicts a screenshot of a section of a referencing document alongside a section of a referenced document displayed below, according to some example embodiments.

To illustrate, FIG. 6 depicts a screenshot of a section of a referencing document alongside a section of a referenced document displayed below, according to some example embodiments. In particular, FIG. 6 depicts screenshot 600 of referencing document 401 and referenced document 501 depicted in screenshot 500 of FIG. 5 after a user hovers over referencing link 404. The referenced section of referenced document 501 includes comment section 606 and comment section 608 that have been added by one or more users that have reviewed the referenced section. Screenshot 600 also includes mouse pointer 602 that can be controlled by a user. In response to a user hovering over referencing link 404, right clicking referencing link 404, etc. with mouse pointer 602, window 604 is displayed near or over the referencing link 404. Window 604 provides a listing of the different metadata, documentation, comments for the referenced section of referenced section 501. In this example, window 604 includes the comments from comment section 606 and the comments from comment section 608.

Some example embodiments enable a user to obtain more information regarding the references in the previous and next views relative to the current view (visual indicator 502 and visual indicator 504). In particular, screenshot 600 includes window 610 and window 612. Window 610 relates to visual indicator 502. Window 612 relates to visual indicator 504. Specifically, window 610 is displayed in response to a user hovering over visual indicator 502, right clicking visual indicator 502, etc. Window 612 is displayed in response to a user hovering over visual indicator 504, right clicking visual indicator 504, etc. Windows 502 and 504 provide information about the number of references. In particular, the number provided for each of visual indicators 502 and 504 (1 and 15, respectively) include the number of references internal and external to the referencing document.

Window 610 indicates the number of references internal to referencing document 401 that are previous to the section currently being viewed and the number of references external to referencing document 401 that were previously viewed by the user. In this example, window 610 indicates that the one previous reference is internal to referencing document 401 and that there are no external references that were previous viewed. Window 612 indicates the number of references internal to referencing document 401 that are subsequent to the section currently being viewed and the number of references external to referencing document 401 that have not yet been viewed by the user. In this example, window 612 indicates that 3 subsequent references are internal to referencing document 401 and that 12 references are external to referencing document 401 and have not yet been viewed by the user.

Accordingly, as described the user can lose track of the flow of the documents because of this constant back and forth that can take place between the original section and the referenced sections. These different visual indicators allows the user to easily jump to a next or previous link in the document (viewable or not). Also, the user can navigate from the referenced document back to referencing links in the referencing document based on the visual indicators.

Reference module 108 can maintain a history of navigation and provide the user the ability to retrace their navigation steps after they close and reopen the referencing and/or referenced documents. Also, reference module 108 can keep the referenced document active (e.g., cached) unless a new reference is selected to point to a different referenced document. Reference module 108 can provide a view of history of the link navigation and restore the navigation link history when the documents are opened. Also, a referenced page can remain active unless a next reference selected points to a different page in the referenced document. Also, when the referenced document is closed, the focus of display can return to the document from which this target or referenced document was invoked (i.e., the source location in the referencing document).

While the examples herein illustrate one referencing document and one referenced document being displayed at a same time, some example embodiments allow for additional documents to be displayed at a same time. For example, multiple referencing documents can reference a same referenced document. When the referenced document is being displayed, reference module 108 can cause the multiple referencing documents that include referencing links to this referenced document to be shown on the same screen. For example, if the number of referencing documents is too large to be individually displayed, the referencing documents can be displayed in a card stack format. A visual indicator can be added that points from the location in the referenced document to that links in the referencing documents. Also, the visual indicator can then point from the referencing link to the referenced location in the referenced document. Also, the referenced document can include referencing links to other sections in the document or other documents. These referencing links therein can be selected to enable the associated referenced section to be displayed alongside the original referencing document and original referenced document.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for navigating through cross-referenced documents as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving an instruction to display a section of a referencing document on a screen, the section having at least one referencing link referencing a different section, wherein the different section comprises at least one of a different section of the referencing document and a different section of a referenced document;
   displaying the section of the referencing document on the screen;
   receiving a selection of a referencing link of the at least one referencing link;
   responsive to receiving the selection,
      displaying, at least partially at a same time of the displaying of the section of the referencing document, the different section referenced by the referencing link on the screen;
      displaying a visual indicator that associates the referencing link with the different section; and
      responsive to determining that the section of the referencing document includes multiple reference links of the at least one reference link to the different section, displaying other visual indicators that associate the multiple referencing links with the different section, wherein the referencing document comprises a previous section that is previous to the section of the referencing document on the screen;

responsive to determining that the previous section of the referencing document that is not currently being viewed on the screen has at least one other referencing link that references the different section, displaying a previous visual indicator that identifies the at least one other referencing link in the previous section, the previous visual indicator comprising a total number of the at least one other referencing links that are within the previous section;

wherein the receiving of the instruction to display the section of the referencing document is in response to input from a user, wherein the user has previously viewed a different referencing document having at least one other referencing link to the different section; and responsive to the user highlighting the previous visual indicator, displaying a window on or near the previous visual indicator that indicates a number of the at least one other referencing link in the referencing document and indicates a number of the at least one other referencing link in the different referencing document.

2. The method of claim 1, wherein the referencing document comprises a next section that is subsequent to the section of the referencing document on the screen, wherein the method further comprises:

responsive to determining that the next section of the referencing document that is not currently being viewed on the screen has at least one other referencing link that references the different section, displaying a next visual indicator that identifies the at least one other referencing link in the next section, the next visual indicator comprising a total number of the at least one other referencing links that are within the next section.

3. The method of claim 2, wherein the receiving of the instruction to display the section of the referencing document is in response to input from a user, wherein a different referencing document having at least one other referencing link to the different section has not been previously viewed by the user, wherein the method comprises:

responsive to the user highlighting the next visual indicator, displaying a window on or near the next visual indicator that indicates a number of the at least one other referencing link in the referencing document and indicates a number of the at least one other referencing link in the different referencing document.

4. The method of claim 1, further comprising responsive to receiving an indicator that a user input is highlighting the at least one referencing link on the screen, displaying metadata associated with the different section in an area on or around the at least one referencing link.

5. The method of claim 4, wherein the metadata comprises comments added by users about content of the different section.

6. A computer program product for document referencing, the computer program product comprising:

a non-transitory computer readable storage medium having computer usable program code embodied therewith, the computer usable program code comprising a computer usable program code configured to:

receive an instruction to display a section of a referencing document on a screen, the section having at least one referencing link referencing a different section, wherein the different section comprises at least one of a different section of the referencing document and a different section of a referenced document;

display the section of the referencing document on the screen;

receive a selection of a referencing link of the at least one referencing link;

responsive to receipt of the selection, display, at least partially at a same time of the display of the section of the referencing document, the different section referenced by the referencing link on the screen;

display a visual indicator that associates the referencing link with the different section; and responsive to a determination that the section of the referencing document includes multiple reference links of the at least one reference link to the different section, display other visual indicators that associate the multiple referencing links with the different section, wherein the referencing document comprises a previous section that is previous to the section of the referencing document on the screen;

responsive to a determination that the previous section of the referencing document that is not currently being viewed on the screen has at least one other referencing link that references the different section, display a previous visual indicator that identifies the at least one other referencing link in the previous section, the previous visual indicator comprising a total number of the at least one other referencing links that are within the previous section, wherein receipt of the instruction to display the section of the referencing document is in response to input from a user, wherein the user has previously viewed a different referencing document having at least one other referencing link to the different section; and responsive to the user highlighting the previous visual indicator, display a window on or near the previous visual indicator that indicates a number of the at least one other referencing link in the referencing document and indicates a number of the at least one other referencing link in the different referencing document.

7. The computer program product of claim 6, wherein the referencing document comprises a next section that is subsequent to the section of the referencing document on the screen, wherein the computer usable program code is configured to:

responsive to a determination that the next section of the referencing document that is not currently being viewed on the screen has at least one other referencing link that references the different section, display a next visual indicator that identifies the at least one other referencing link in the next section, the next visual indicator comprising a total number of the at least one other referencing links that are within the next section.

8. The computer program product of claim 7, wherein receipt of the instruction to display the section of the referencing document is in response to input from a user, wherein a different referencing document having at least one other referencing link to the different section has not been previously viewed by the user, wherein the computer usable program code is configured to:

responsive to the user highlighting the next visual indicator, display a window on or near the next visual indicator that indicates a number of the at least one other referencing link in the referencing document and indicates a number of the at least one other referencing link in the different referencing document.

9. The computer program product of claim 6, wherein the computer usable program code is configured to:

responsive to receipt of an indicator that a user input is highlighting the at least one referencing link on the screen, display metadata associated with the different section in an area on or around the at least one referencing link.

10. The computer program product of claim 9, wherein the metadata comprises comments added by users about content of the different section.

11. An apparatus comprising:
a screen;
a processor communicatively coupled to the screen;
a reference module executable on the processor, the reference module configured to,
   receive an instruction to display a section of a referencing document on the screen, the section having at least one referencing link referencing a different section, wherein the different section comprises at least one of a different section of the referencing document and a different section of a referenced document;
   display the section of the referencing document on the screen;
   receive a selection of a referencing link of the at least one referencing link;
   responsive to receipt of the selection,
      display, at least partially at a same time of the displaying of the section of the referencing document, the different section referenced by the referencing link on the screen;
      display a visual indicator that associates the referencing link with the different section; and
      responsive to a determination that the section of the referencing document includes multiple reference links of the at least one reference link to the different section, display other visual indicators that associate the multiple referencing links with the different section, wherein the referencing document comprises a next section that is subsequent to the section of the referencing document on the screen;
   responsive to a determination that the next section of the referencing document that is not currently being viewed on the screen has at least one other referencing link that references the different section, display a next visual indicator that identifies the at least one other referencing link in the next section, the next visual indicator comprising a total number of the at least one other referencing links that are within the next section, wherein receipt of the instruction to display the section of the referencing document is in response to input from a user, wherein a different referencing document having at least one other referencing link to the different section has not been previously viewed by the user; and
   responsive to the user highlighting the next visual indicator, display a window on or near the next visual indicator that indicates a number of the at least one other referencing link in the referencing document and indicates a number of the at least one other referencing link in the different referencing document.

12. The apparatus of claim 11, wherein the referencing document comprises a previous section that is previous to the section of the referencing document on the screen, wherein the reference module is configured to:
   responsive to a determination that the previous section of the referencing document that is not currently being viewed on the screen has at least one other referencing link that references the different section, display a previous visual indicator that identifies the at least one other referencing link in the previous section, the previous visual indicator comprising a total number of the at least one other referencing links that are within the previous section.

13. The apparatus of claim 12, wherein receipt of the instruction to display the section of the referencing document is in response to input from a user, wherein the user has previously viewed a different referencing document having at least one other referencing link to the different section, wherein the reference module is configured to:
   responsive to the user highlighting the previous visual indicator, display a window on or near the previous visual indicator that indicates a number of the at least one other referencing link in the referencing document and indicates a number of the at least one other referencing link in the different referencing document.

14. The apparatus of claim 11, wherein the reference module is configured to:
   responsive to receipt of an indicator that a user input is highlighting the at least one referencing link on the screen, display metadata associated with the different section in an area on or around the at least one referencing link.

* * * * *